(12) United States Patent
Yonaha

(10) Patent No.: US 8,004,733 B2
(45) Date of Patent: Aug. 23, 2011

(54) METHOD, APPARATUS, AND PROGRAM FOR DETECTING INADEQUATELY TRIMMED IMAGES

(75) Inventor: Makoto Yonaha, Kanagawa-ken (JP)

(73) Assignee: Fujifilm Corporation, Tokyo (JP)

( * ) Notice: Subject to any disclaimer, the term of this patent is extended or adjusted under 35 U.S.C. 154(b) by 1611 days.

(21) Appl. No.: 11/063,569

(22) Filed: Feb. 24, 2005

(65) Prior Publication Data

US 2005/0190406 A1 Sep. 1, 2005

(30) Foreign Application Priority Data

Feb. 26, 2004 (JP) .................................. 2004-051323

(51) Int. Cl.
G06K 15/00 (2006.01)
H04N 1/46 (2006.01)

(52) U.S. Cl. ...... 358/537; 358/1.17; 358/1.18; 358/538; 358/540

(58) Field of Classification Search .................. 358/1.18, 358/448, 453, 1.9, 452, 537, 538, 1.17, 540; 283/77; 382/229, 282, 286, 115; 348/96, 348/97

See application file for complete search history.

(56) References Cited

U.S. PATENT DOCUMENTS

| | | | | |
|---|---|---|---|---|
| 7,129,961 B1 * | 10/2006 | Samra | ........................... | 345/620 |
| 7,286,161 B2 * | 10/2007 | Watanabe et al. | .......... | 348/207.2 |
| 2002/0085771 A1 * | 7/2002 | Sakuramoto | ................... | 382/282 |
| 2003/0095131 A1 * | 5/2003 | Rondinelli | ..................... | 345/582 |
| 2003/0197894 A1 * | 10/2003 | Miyamoto et al. | ........... | 358/1.18 |
| 2004/0017481 A1 * | 1/2004 | Takasumi et al. | ......... | 348/207.99 |
| 2004/0239982 A1 * | 12/2004 | Gignac | ........................ | 358/1.15 |
| 2005/0105806 A1 * | 5/2005 | Nagaoka et al. | .............. | 382/224 |

FOREIGN PATENT DOCUMENTS

JP 11-341272 A 12/1999

\* cited by examiner

*Primary Examiner* — James A Thompson
(74) *Attorney, Agent, or Firm* — Birch, Stewart, Kolasch & Birch, LLP

(57) ABSTRACT

Detection of inadequately trimmed images can be carried out promptly and accurately among a large amount of trimmed images obtained through automatic trimming. The trimmed images generated through the automatic trimming are reproduced three times at an image display rate of 30 images per second. Order of reproduction is changed randomly in each time of reproduction. When an operator carries out input for indicating finding of an inadequately trimmed image in each time of reproduction, 10 images arranged 6 to 15 images backward in a display sequence from the image being displayed at the time of input are marked as an image group including the inadequately trimmed image, in response to the input. Only the trimmed images marked in all the rounds of reproduction are extracted as candidates for the inadequately trimmed image.

8 Claims, 4 Drawing Sheets

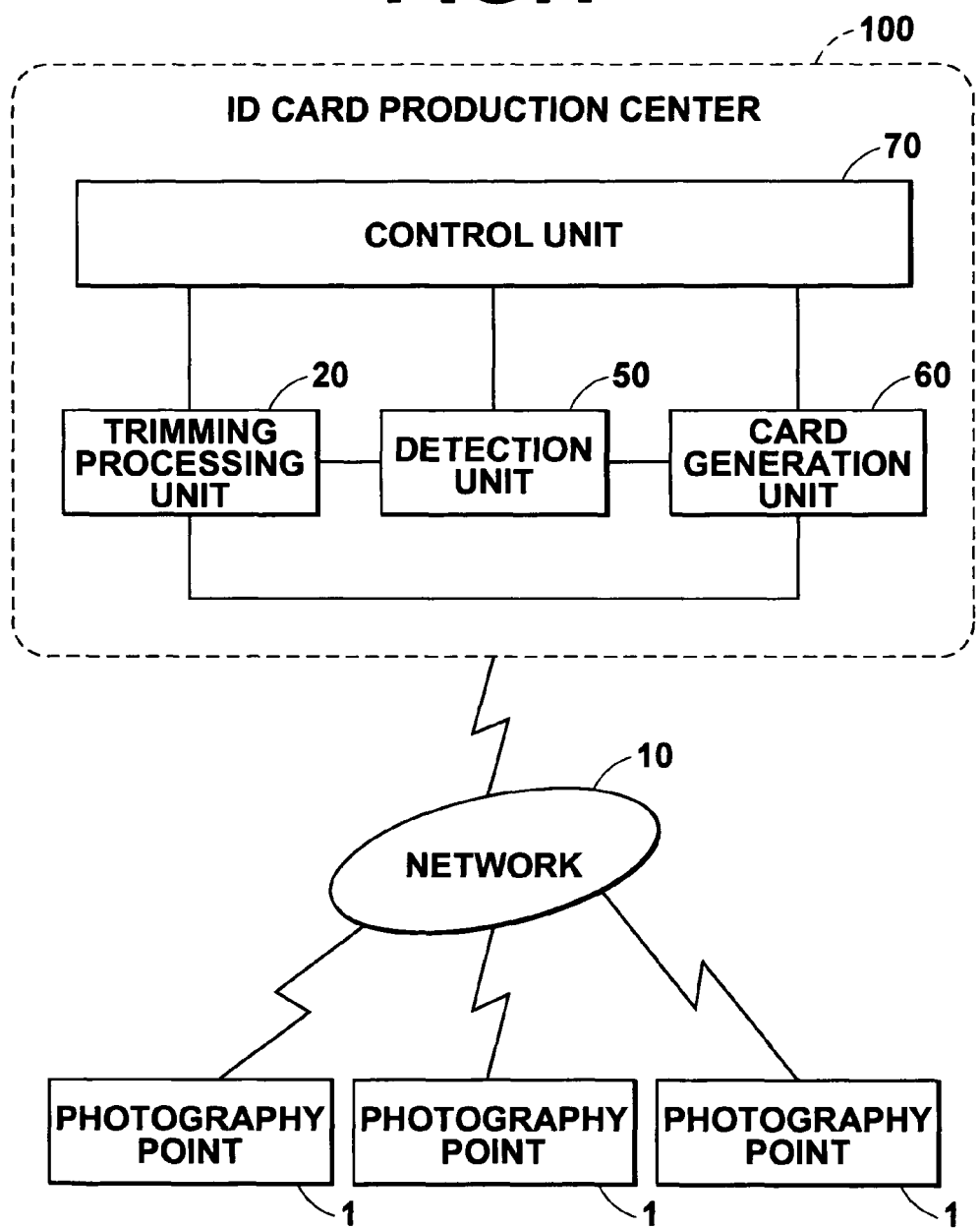

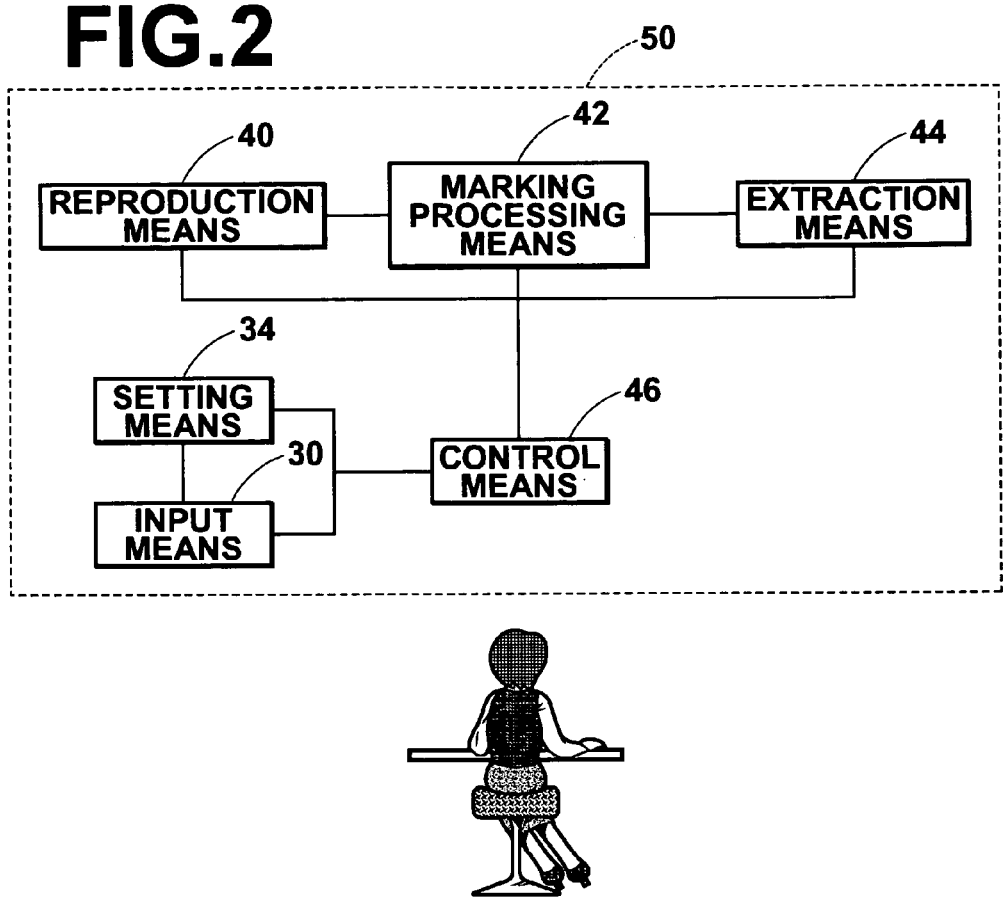
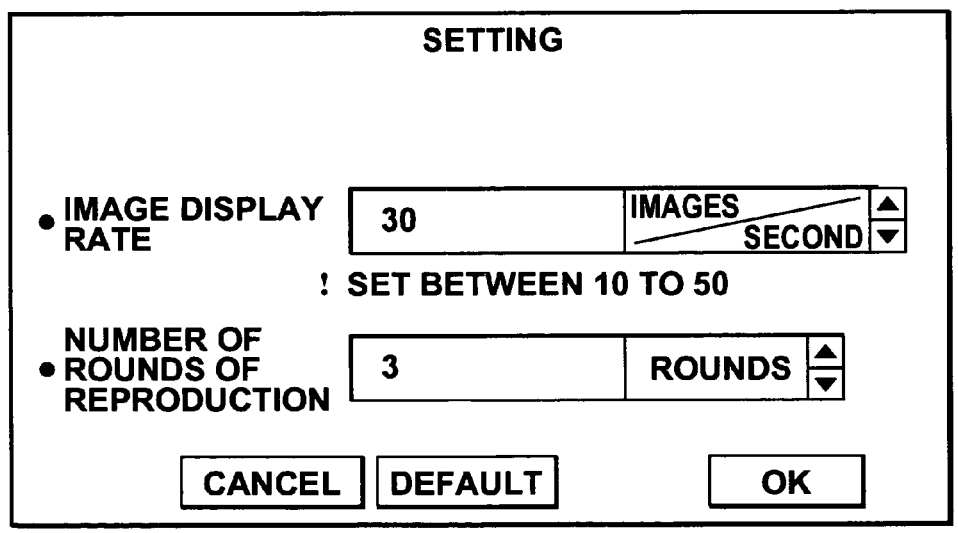

METHOD, APPARATUS, AND PROGRAM FOR DETECTING INADEQUATELY TRIMMED IMAGES

BACKGROUND OF THE INVENTION

1. Field of the Invention

The present invention relates to a method and an apparatus for detecting inadequately trimmed images from a large amount of trimmed images obtained through automatic trimming. The present invention also relates to a program that causes a computer to execute the method for detecting inadequately trimmed images.

2. Description of the Related Art

In the case of application for a passport or driver's license or generation of a resume, submission of a photograph representing a face (hereinafter referred to as an ID photo) is often required in a predetermined format. For this reason, an automatic photography apparatus has been used. Such an automatic photography apparatus has a photography room and photographs a user sitting on a stool in the room. Face images of the user are then printed on a sheet. In this manner, the sheet of photo IDs is generated automatically. However, such an apparatus is large and locations for installation thereof are thus limited. Consequently, a user needs to find and visit the location to obtain an ID photo, which is inconvenient for the user.

In order to solve this problem, a method of generating an ID photo has been proposed, as in Japanese Unexamined Patent Publication No. 11(1999)-341272, for example. In this method, when a user specifies positions of the top of the head and the chin in a face image displayed on a display device such as a monitor, a computer finds a magnification ratio and a face position according to the two positions and a format of an ID photo to be generated. The computer then enlarges or reduces the face image so that the face in the image after enlargement or reduction can be positioned in a predetermined position in the ID photo to be generated. Thereafter, the computer trims the enlarged or reduced image, and generates the ID photo. By using this method, a user can request generation of an ID photo from a DPE store or the like, which is much easier to find than an automatic photography apparatus. In addition, a user can also request generation of an ID photo by bringing a film or a recording medium having a preferred photo recorded therein to a DPE store or the like.

However, in this method, an operator needs to specify the two positions in a displayed face image, which is a burden on the operator especially in the case where the number of users is large. Furthermore, in the case where an area of the face in a face image being displayed is small or in the case where resolution of a face image is low, the operator finds it difficult to promptly and accurately specify the two positions. Therefore, prompt generation of an appropriate ID photo cannot be expected.

For this reason, methods for promptly and accurately setting a trimming range while reducing the burden on an operator have also been proposed. Especially, following the progress of automatic detection techniques, an automatic trimming method has been drawing attention. In this method, a face and eyes are detected in a photo and a trimming range is set according to a result of detection. By using such a method, an ID photo can be generated from a face image without specification of the two positions by an operator. For example, a method has been proposed in U.S. patent Application Publication No. 20020085771 for setting a trimming range. In this method, positions of the top of the head and eyes are detected in a face image and a position of chin is inferred based on the detected positions. In this manner, the trimming range is set.

Meanwhile, in the case of updating IDs of employees in a large company or in the case of issuance or update of driver's licenses in a driver's license center, efficient processing thereof is desired. For example, an operation is not efficient if each applicant is photographed to obtain a face image and a trimmed image is generated from the face image for generation of an ID or a driver's license (hereinafter collectively referred to as a card). However, if an operation is divided into photography processing, trimming processing, and card generation processing, all applicants can be photographed to obtain face images, and trimmed images can be generated from the face images and used for card generation. In this manner, operators dedicated to each processing can be trained, which is efficient.

However, although automatic trimming has a high rate of success, detection of faces and eyes in photographs is not necessarily 100% successful. For example, in the case where a person in a photograph to be subjected to automatic trimming has a unique hairstyle or wears tinted glasses, failure of detection may lead to wrong automatic trimming range setting or a wrong area size regarding a part to be trimmed automatically (the face in the case of a human). Therefore, inspection by an operator is desired regarding a large amount of trimmed images generated through automatic trimming.

An operator can inspect trimmed images by viewing the trimmed images displayed one by one, for example. This method is simple and thus easy to carry out. However, the time necessary therefore is as long as in the case of trimming carried out by an operator, and a burden on the operator is heavy. Therefore, in order to shorten the time for inspection, a method may be carried out for detecting inadequately trimmed images by display of thumbnail images generated by reduction of trimmed images. In this method, the thumbnail images are inspected for presence of a different size or position of a part to be trimmed. However, although this method can shorten the time by inspecting the images collectively, using the thumbnail images generated from the trimmed images lowers accuracy of detection.

SUMMARY OF THE INVENTION

The present invention has been conceived based on consideration of the above circumstances. An object of the present invention is therefore to provide an inadequately trimmed image detection method, an inadequately trimmed image detection apparatus, and a program for accurately and promptly detecting inadequately trimmed images by judging adequacy or inadequacy of a large amount of trimmed images generated through automatic trimming processing.

An inadequately trimmed image detection method of the present invention is a method for detecting an inadequately trimmed image generated by failure of automatic trimming processing among a large amount of trimmed images in a predetermined size generated by the automatic trimming processing wherein a trimming range is cut and/or scaled from respective photographs obtained by photography of subjects of the same type so that a target part to be trimmed is laid out in a predetermined position in a predetermined size in the trimming range. The inadequately trimmed image detection method comprises the steps of:

carrying out serial reproduction of the trimmed images in a predetermined position at a predetermined image display rate; and carrying out marking processing for identifying an image group including the inadequately trimmed image, based on input representing finding of the inadequately trimmed image during the reproduction.

Trimmed images have two characteristics if generated through automatic trimming of photographs obtained by photography of subjects of the same type (such as people). As has been described above, automatic trimming has a high success rate due to improvement in techniques as a basis for detecting a face and eyes, for example. The success rate is approximately 99% on an experimental basis, and most of trimmed images obtained through such automatic trimming are adequately trimmed images generated by success of automatic trimming. Therefore, one of the characteristics is presence of extremely few inadequately trimmed images generated by failure of automatic trimming. The other characteristic is that a position and a size of a target part to be trimmed (the face in the case of human) in inadequately trimmed images are different from those in adequately trimmed images although the position and the size are almost the same in the adequately trimmed images. The present invention aims to promptly and accurately detect inadequately trimmed images by using the two characteristics of inadequately trimmed images generated through automatic trimming, as well as an afterimage effect whereby an afterimage of an object remains in human vision after viewing the object. In the inadequately trimmed image detection method of the present invention, the large amount of trimmed images generated through automatic trimming are serially reproduced first at the predetermined image display rate in the predetermined position (at the center of a display device such as a monitor, for example). Due to the two characteristics described above, an operator inspecting the serially reproduced trimmed images views similar images (the adequately trimmed images) for a long time and rarely views an inadequately trimmed image. When the operator views an inadequately trimmed image having the different position and size from the adequately trimmed images having the preferable position and size, the operator senses strangeness and finds the inadequately trimmed image due to the afterimages of the adequately trimmed images displayed before the inadequately trimmed image.

In the inadequately trimmed image detection method of the present invention, when the operator senses strangeness, the operator carries out the input (such as pressing a predetermined key or clicking a mouse of a computer) indicating the finding of the inadequately trimmed image by using input means (such as the keyboard or the mouse) connected to the display device, for example. Based on the input, the marking processing is carried out to identify the image group including the inadequately trimmed image.

The higher the image display rate is, the shorter the time for detecting an inadequately trimmed image becomes. However, if the image display rate is too fast, human vision cannot distinguish adequately trimmed images from inadequately trimmed images. Therefore, in the present invention, the image display rate is preferably 50 images per second or slower. Since an after image stays for approximately 0.2 seconds in human vision due to the afterimage effect, the afterimage effect cannot be used if the image display rate is too slow. Consequently, accuracy of detection becomes lower. Therefore, in the present invention, it is preferable for the image display rate to be 10 or more images per second.

The marking processing identifies as the image group the trimmed images reproduced in a predetermined time range before the input. The time the operator senses strangeness (that is, the time the inadequately trimmed image is found) is slightly different from the time of the input indicating the strangeness. Hereinafter, the time difference is referred to as a reaction time. Therefore, the inadequately trimmed image corresponding to the input was reproduced before the trimmed image being reproduced at the time of input. The present invention pays attention to the reaction time, and the trimmed images reproduced in the predetermined time range before the input are marked as the image group.

In order to include the inadequately trimmed image corresponding to the input in the image group with certainty, the predetermined time range needs to include the instance that is earlier than the time of input by the reaction time, and the reaction time varies from person to person. Therefore, the predetermined time range may be several seconds before the time of input so that the instant is included in the predetermined time range with certainty. However, the longer the predetermined time range becomes, the heavier a burden on later processing becomes due to the increasing number of images included in the image group. Although the reaction time varies from person to person, an average reaction time is approximately 0.3 seconds. Therefore, in the present invention, the predetermined time range preferably refers to a period of 0.2~0.6 seconds whose midpoint is approximately the instant that is 0.3 seconds earlier than the time of input. For example, the predetermined time range may range from the time of input to the time that is 0.6 seconds earlier than the time of input, or from the time that is 0.1 seconds earlier than the time of input to the time that is 0.5 seconds earlier than the time of input, or from the time that is 0.2 seconds earlier than the time of input to the time that is 0.4 seconds earlier than the time of input, or from the time that is 0.2 seconds earlier than the time of input to the time that is 0.5 seconds earlier than the time of input.

In the inadequately trimmed image detection method of the present invention, it is preferable for a guide image to be displayed in superposition on the trimmed images during the reproduction thereof, for representing a position of the trimming target part in the trimming range in an adequately trimmed image generated in the case where the automatic trimming processing is carried out properly.

The guide image may be any image as long as the image can indicate the position. For example, the guide image may be a line or a frame representing the position, or a sample image as an adequately trimmed image.

Although the guide image can be any image as long as the position can be shown thereby, it is more preferable for the guide image to show a size of the target part in an adequately trimmed image.

An inadequately trimmed image detection apparatus of the present invention is an apparatus for detecting an inadequately trimmed image generated by failure of automatic trimming processing among a large amount of trimmed images in a predetermined size generated by the automatic trimming processing wherein a trimming range is cut and/or scaled from respective photographs obtained by photography of subjects of the same type so that a target part to be trimmed is laid out in a predetermined position in a predetermined size in the trimming range. The inadequately trimmed image detection apparatus comprises:

reproduction means for carrying out serial reproduction of the trimmed images in a predetermined position at a predetermined image display rate;

input means for carrying out input indicating finding of the inadequately trimmed image during the reproduction; and marking means for carrying out marking processing for identifying an image group including the inadequately trimmed image, based on the input from the input means.

It is preferable for the predetermined image display rate used by the reproduction means to range from 10 images per second to 50 images per second.

The marking means identifies the trimmed images reproduced in a predetermined time range before the input as the image group.

It is preferable for the inadequately trimmed image detection apparatus of the present invention to further comprise image display rate setting means for setting the image display rate so that the reproduction means can carry out the reproduction according to the image display rate set by the image display rate setting means.

It is also preferable for the reproduction means to display a guide image in superposition on the trimmed images, for representing a position of the trimming target part in the trimming range in an adequately trimmed image generated in the case where the automatic trimming processing is carried out properly.

It is also preferable for the inadequately trimmed image detection apparatus of the present invention to further comprise reproduction control means for causing the reproduction means to carry out the reproduction of the trimmed images more than once in different reproduction order and/or image display rate. In this case, the marking means carries out the marking processing in each time the trimmed images are reproduced by the reproduction means. In the case where the reproduction order is changed, the order is preferably changed randomly. It is also preferable for the inadequately trimmed image detection apparatus of the present invention to further comprise extraction means for extracting the trimmed images included in all the image groups obtained by the marking means in all the times of reproduction as candidates for the inadequately trimmed image.

A program of the present invention causes a computer to execute the inadequately trimmed image detection method of the present invention.

According to the present invention, the large amount of trimmed images generated through automatic trimming processing are serially reproduced at the predetermined image display rate. Most of the trimmed images are adequately trimmed images and have almost the same position and size of the target part. On the other hand, in an inadequately trimmed image rarely included in the trimmed images, the position and the size are different from those in the adequately trimmed images. Therefore, if an operator views an inadequately trimmed image during inspection of trimmed images that are reproduced serially, the operator senses visual strangeness due to an afterimage effect generated by the similar images (the adequately trimmed images) reproduced serially for a long time. The operator thus finds the inadequately trimmed image based on the strangeness, and carries out the input indicating the finding. According to the present invention, the trimmed images reproduced in the predetermined time range before the input by the operator are specified as the image group including the inadequately trimmed image. In this manner, only the trimmed images included in the image group obtained by the marking processing need to be inspected again by the operator or are subjected to automatic trimming again, which is efficient. Furthermore, since the large amount of trimmed images are reproduced serially, time necessary for inspection is short, which causes a burden on the operator to become lighter. In addition, the trimmed images are reproduced in an original size without reduction thereof. Therefore, accuracy of inadequately trimmed image detection is high.

If the guide image is also displayed during reproduction for representing the position and the size of the trimming target part in the trimming range in an adequately trimmed image generated by successful automatic trimming processing, inadequately trimmed images that are hard to find by the afterimage effect alone, such as images wherein the target part shifts gradually or the size of the target part changes gradually, can also be found.

If the inadequately trimmed image detection apparatus of the present invention further comprises the image display rate setting means for setting the image display rate for the reproduction means, the operator can set the image display rate optimally by himself/herself. Therefore, failure of detection due to individual differences can be prevented.

If the inadequately trimmed image detection apparatus of the present invention comprises the reproduction control means for causing the reproduction means to reproduce the trimmed images more than once in the different reproduction order and/or image display rate and if the marking means carries out the marking processing at each time of reproduction, accuracy of detection can further be improved. In this case, if the inadequately trimmed image detection apparatus further comprises the extraction means for extracting the trimmed images included in all the image groups obtained by the marking means in all rounds of the reproduction as the candidates for the inadequately trimmed image, the number of the images to be confirmed in later processing can be smaller, which is efficient.

Note that the program of the present invention may be provided being recorded on a computer readable medium. Those who are skilled in the art would know that computer readable media are not limited to any specific type of device, and include, but are not limited to: CD's, RAM's ROM's, hard disks, magnetic tapes, and internet downloads, in which computer instructions can be stored and/or transmitted. Transmission of the computer instructions through a network or through wireless transmission means is also within the scope of this invention. Additionally, the computer instructions include, but are not limited to: source, object, and executable code, and can be in any language, including higher level languages, assembly language, and machine language.

BRIEF DESCRIPTION OF THE DRAWINGS

FIG. 1 is a block diagram showing the configuration of an ID card issuing system of an embodiment of the present invention;

FIG. 2 is a block diagram showing the configuration of a detection unit 50 in an ID card production center 100 in the ID card issuing system shown in FIG. 1;

FIG. 3 shows an example of a setting screen provided by setting means 34 in the detection unit 50 shown in FIG. 2;

DESCRIPTION OF THE PREFERRED EMBODIMENT

Figure 4:
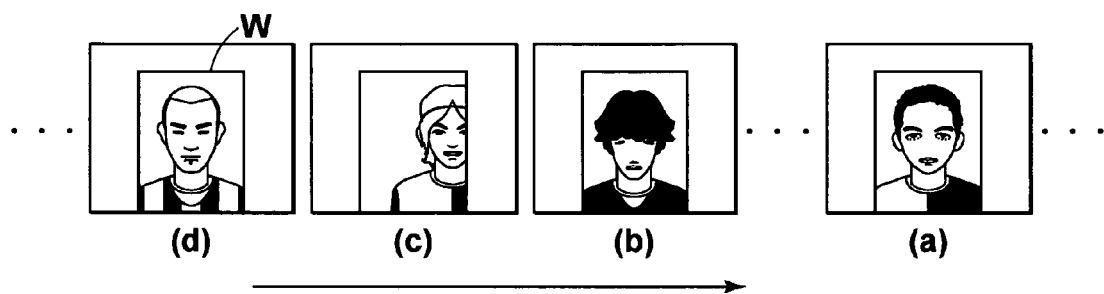
FIG. 4 shows examples of trimmed images.

Hereinafter, an embodiment of the present invention will be described with reference to the accompanying drawings.

FIG. 1 is a block diagram showing the configuration of an ID card issuing system in the embodiment of the present invention. As shown in FIG. 1, the ID card issuing system comprises photography points 1 for obtaining photographs by photography of people whose ID cards are to be generated and an ID card production center 100 for generating the ID cards by using the photographs sent from the photography points. The photography points 1 and the ID card production center 100 are connected to each other by a network 10. Therefore, the photographs obtained at the photography points 1 are sent to the ID card production center 100 via the network 10.

The ID card production center 100 comprises a trimming processing unit 20, a detection unit 50, a card generation unit 60, and a control unit 70 for controlling the trimming processing unit 20, the detection unit 50, and the card generation unit 60.

The trimming processing unit 20 carries out trimming processing on the photographs sent from the photography points 1. In the explanation below, a case will be described where photographs of approximately 5000 employees in a company having branches all over a country are sent from the photography points 1 to the ID card production center 100 for update of employee identification cards. The trimming processing unit 20 carries out face detection processing and eye detection processing on the photographs, and carries out the trimming processing by setting a trimming range for causing a part from shoulders to the top of the head to be positioned in a predetermined position and in a predetermined size according to a format of a face image in the ID card. The trimming processing unit 20 carries out scaling processing upon necessity, since a size of trimmed images needs to agree with the format.

The control unit 70 stores the trimmed images generated by the trimming processing unit 20 in a storage unit not shown, and outputs the trimmed images to the detection unit 50 in response to an instruction input by an operator via input means 30 of the detection unit 50 for starting detection as will be described later.

FIG. 2 is a block diagram showing the configuration of the detection unit 50 in the ID card production center 100. The configuration of the detection unit 50 shown in FIG. 2 is realized by causing a computer (such as a personal computer) to execute a detection program read out to a storage device. The detection program is stored in a recording medium such as a CD-ROM or provided via a network such as the Internet, and installed in the computer.

As shown in FIG. 2, the detection unit 50 comprises the input means 30, setting means 34, reproduction means 40, marking processing means 42, extraction means 44, and control means 46 for controlling the respective means. Hereinafter, each of the means will be explained in detail.

The input means 30 is used by the operator for carrying out various kinds of input, and comprises a keyboard and a mouse of the computer, for example. The operator can carry out the various kinds of input by using the input means 30 of the detection unit 50, for using various settings such as image display rate setting and reproduction repetition setting provided by the setting means 34 (which will be explained later in detail), for indicating finding of an inadequately trimmed image, and for instructing the detection unit 50 to start or stop the detection, for example.

The setting means 34 is used for setting the image display rate and how many times the trimmed images are reproduced (hereinafter referred to as the number of rounds of reproduction). FIG. 3 shows an example of a setting menu provided by the setting means 34. The setting menu is displayed on the reproduction means 40 by the control means 46. As shown in FIG. 3, the operator can set the image display rate and the number of rounds, by using the input means 30 for directly inputting a number or clicking a triangle button in the setting menu screen provided by the setting means 34. In the example shown in FIG. 3, the setting means 34 sets the image display rate and the number of rounds to 30 images per second and 3 rounds by default. The setting means 34 limits the image display rate to being range from 10 to 50 images per second. A Cancel button, a Default button, and an OK button are displayed at the bottom of the setting menu screen. When the OK button is clicked, the settings input by the operator are confirmed. When the Cancel button is clicked, the settings displayed in the screen are canceled for maintaining the settings confirmed last time. If the Default button is clicked, the default settings are displayed. If the OK button is clicked in this state, the default settings are confirmed. In the explanation below, it is assumed that the default settings have been confirmed.

The control means 46 controls the reproduction means 40, the marking processing means 42, and the extraction means 44 according to the image display rate and the number of rounds set by the setting means 34, and causes the respective means to carry out the processing thereof. In the explanation below, operation of the reproduction means 40, the marking processing means 42, and the extraction means 44 is controlled by the control means 46.

The reproduction means 40 reproduces 3 times the trimmed images output by the control unit 70 from the storage unit not shown, at the image display rate of 30 images per second. Order of reproduction of the trimmed images in the second and third rounds is changed randomly by the control means 46 to be different from the first round.

FIG. 4 shows an example of how the trimmed images are displayed during reproduction by the reproduction means 40. During reproduction, the reproduction means 40 displays a reference frame W together with the trimmed images, for representing a size and a position of the target part (from shoulders to the top of the head, in this case) in an adequately trimmed image. An arrow shown in FIG. 4 indicates the reproduction order in a display sequence of the trimmed images. In other words, the trimmed images are reproduced serially from the right.

In the example shown in FIG. 4, images (a), (b), and (d) are adequately trimmed images while an image (c) is an inadequately trimmed image. The operator views the trimmed images at the image display rate of 30 images per second. When the operator views the image (c), he/she senses strangeness and carries out the input indicating the strangeness, that is, finding of the inadequately trimmed image, by using the input means 30. The input may be carried out by clicking the mouse of the input means 30 once, for example.

The marking processing means 42 marks an image group including the inadequately trimmed image in response to the clicking of the mouse during the reproduction by the reproduction means 40. In this embodiment, the marking processing means 42 marks the images reproduced in a predetermined time range before the clicking as the image group. The predetermined time range is determined by the control means 46 according to the image display rate. In this embodiment, the control means 46 defines that the images to be marked are the images reproduced 0.2 second to 0.5 second earlier than the clicking. Therefore, according to the image display rate are marked 10 images arranged 6 to 15 images backward in the display sequence from the image being displayed at the time of the clicking.

Assume that image groups F11 to F14 each including 10 images are marked during the reproduction for the first time, while image groups F21 to F23 and F31 to F33 are marked in the reproduction for the second time and the third time, respectively.

The control means 46 causes the extraction means 44 to extract candidates for an inadequately trimmed image after completion of all the rounds of reproduction by the reproduction means 40.

The extraction means 44 compares all the images included in the image groups F11 to F14 to all the images in the image groups F21 to F23 and F31 to F33, and extracts the images included in all the image groups comprising the image groups F11 to F14, F21 to F23, and F31 to F33 as the candidates.

The control means 46 stores the images extracted by the extraction means 44 in the storage unit (not shown), and outputs the remaining images, that is, the adequately trimmed images, to the card generation unit 60.

The card generation unit 60 generates the ID cards (the employee identification cards, in this case) by using the adequately trimmed images output from the detection unit 50.

Figure 5:
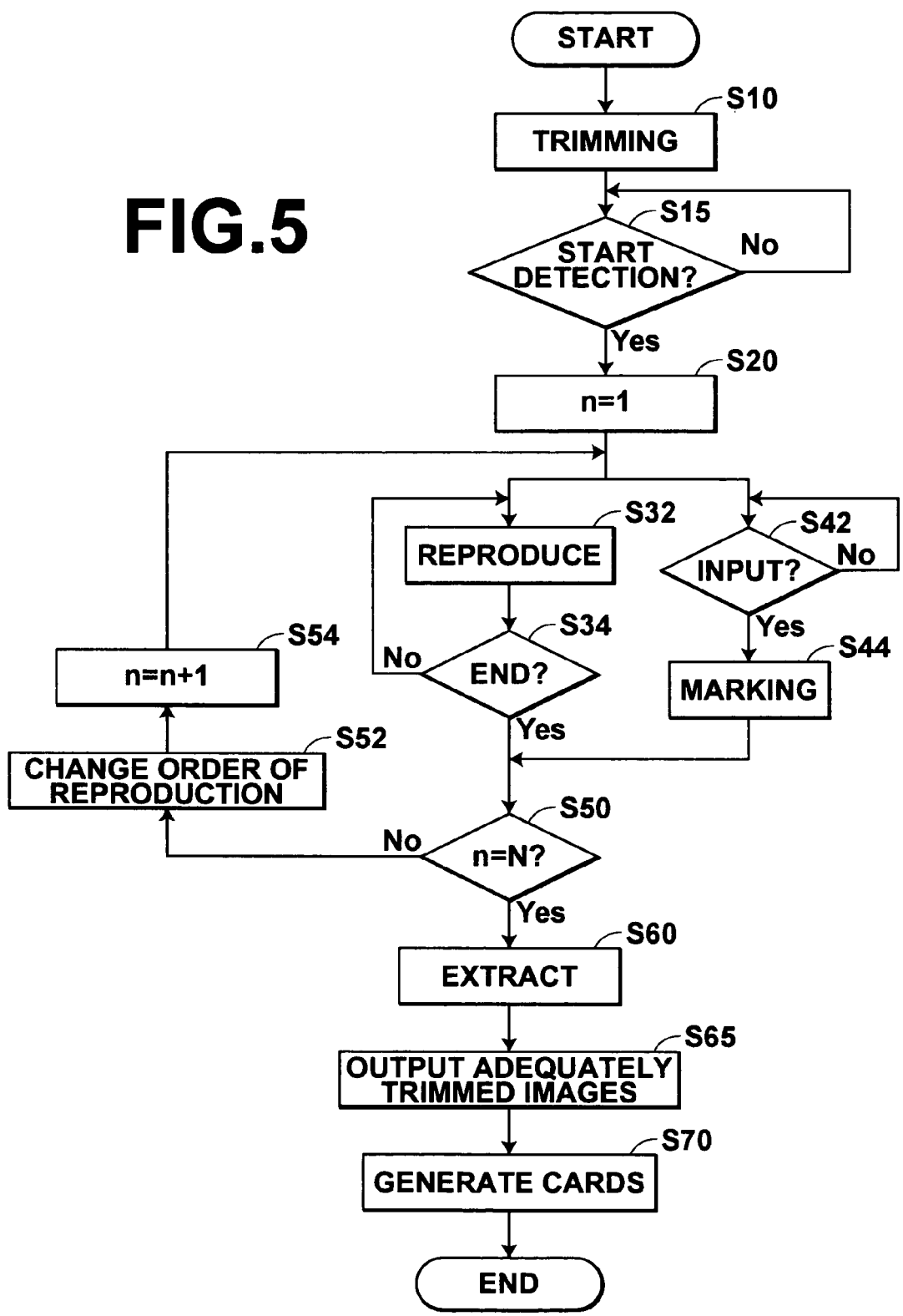
FIG. 5 is a flow chart showing a procedure carried out in the ID card production center 100 in the ID card issuing system in FIG. 1.

FIG. 5 is a flow chart showing a procedure carried out in the ID card production center 100 in the ID card issuing system shown in FIG. 1. Assume that the operator has set the image display rate and the number of rounds via the input means 30 and the setting means 34, and the default settings (30 images per second and 3 rounds) have been confirmed. The photographs obtained by photography of all the employees at the photography points 1 are subjected to the trimming processing by the trimming processing unit 20 in the ID card production center 100, and the trimmed images are generated for all the employees (S10). The trimmed images are stored in a folder "Trimmed Images" in a folder "XX Company" in the storage unit not shown, for example. The photographs before trimming are also stored in a folder "Original Images" in the folder "XX Company". When the operator selects the folder "XX Company" by using the input means 30 of the detection unit 50 to instruct the detection unit 50 to start detection (S15: Yes), the trimmed images stored in the folder "Trimmed Images" are output to the detection unit 50 by the control unit 70. The control means 46 in the detection unit 50 causes the reproduction unit 40 to carry out the first round of serial reproduction of the trimmed images at the image display rate that has been set (S20, S32). During the reproduction, the operator clicks the mouse to indicate strangeness he/she sensed (S42: Yes). The marking processing means 42 in the detection unit 50 carries out the marking processing on the 10 images arranged 6 to 15 images backward in the display sequence from the image being displayed at the time of clicking (S44). Reproduction of the trimmed images and the marking processing are carried out (the procedure from S32 to S44) until completion of reproduction of all of the trimmed images. The control means 46 in the detection unit 50 confirms the number of rounds of reproduction (S50). If the number is equal to a number N (3, in this case) that has been set (S50: Yes), the procedure goes to extraction processing (S60). If the number N is larger, the control means 46 randomly changes the order of reproduction of the trimmed images (S52), and causes the reproduction means 40 and the marking processing means 42 to respectively carry out the reproduction and the marking processing. In this manner, the procedure from S32 to S44 is carried out again by the reproduction means 40 and the marking processing means 42 (S54, S32~S44).

The reproduction means 40 completes the reproduction according to the number N representing the number of rounds (S50: Yes). The control means 46 in the detection unit 50 causes the extraction means 44 to carry out the extraction processing for finding an inadequately trimmed image. The extraction means 44 extracts the images marked by the marking processing means 42 in all the rounds of reproduction as the candidates for an inadequately trimmed image (S60). The candidates are stored in a folder "Inadequately Trimmed Image Candidates" in the folder "XX Company", for example.

The control means 46 in the detection unit 50 outputs the remaining images as the adequately trimmed images to the card generation unit 60 after the extraction means 44 has extracted the candidates (S65). The control unit 70 in the ID card production center 100 causes the card generation unit 60 to generate the ID cards (the employee identification cards) by using the adequately trimmed images output from the detection unit 50 (S70).

As has been described above, according to the ID card issuing system in this embodiment, the large amount of trimmed images obtained by automatic trimming processing by the trimming processing unit 20 are reproduced serially at the predetermined image display rate. By using the two characteristics of trimmed images obtained by automatic trimming and the afterimage effect of human vision, the images reproduced in the predetermined time range before the input (clicking) by the operator for indicating strangeness he/she sensed during reproduction are specified as the image group including an inadequately trimmed image. In this manner, the large amount of trimmed images can be examined collectively by the serial reproduction thereof, which is efficient. Furthermore, since the trimmed images are not reduced to thumbnail images and reproduced in the original size, accuracy of detection can be higher than a method using thumbnail images.

Although the preferred embodiment of the present invention has been described above, the method, the apparatus, and the program of the present invention for detecting an inadequately trimmed image are not necessarily limited to the embodiment described above. Various modifications can be made thereto, within the scope of the present invention.

For example, in the ID card production center 100 in the ID card issuing system of the embodiment shown in FIG. 1, the control means 46 in the detection unit 50 changes the order of reproduction at each time the reproduction means 40 carries out the serial reproduction of the trimmed images. However, not only the order of reproduction but also the image display rate may be changed. In this case, it is preferable for the image display rate for the second and third rounds to be faster and slower than for the first round, respectively. Reproduction without changing the order and the rate may be carried out. In addition, only the image display rate may be changed, without changing the order.

In the ID card production center 100 in the ID card issuing system shown in FIG. 1, the candidates for an inadequately trimmed image detected by the detection unit 50 are stored in the "Inadequately Trimmed Image Candidates" folder in the storage unit not shown. How to deal with the candidates may be judged by the operator. For example, the operator may cause the reproduction means 40 to reproduce the candidates for confirmation so that the operator can carry out trimming again on the image having been judged to be an inadequately trimmed image through the confirmation (although automatic trimming may be used, it is preferable for the operator to manually carry out trimming for specifying the trimming range, for example) while the remaining images can be output to the card generation unit 60. However, after output of the images other than the candidates to the card generation unit 60, the control means 46 in the detection unit 50 may cause the reproduction means 40 to automatically reproduce the candidates stored in the "Inadequately Trimmed Image Candidates" folder in the storage unit. In this case, instead of serial reproduction, the candidates are reproduced one by one. In the case where the operator carries out input (such as clicking) representing that the image being displayed is judged to be an adequately trimmed image, the image is output to the card generation unit 60. In the case where the operator carries out input (such as pressing a predetermined key in the keyboard) representing that the image being displayed is judged to be an inadequately trimmed image, the original of the image is output to the trimming processing unit 20 for re-trimming. A subsequent one of the images is displayed in response to the input representing the judgment by the operator (such as clicking for adequately trimmed image and pressing the predetermined key in the case of inadequately trimmed image). In an "Inadequately Trimmed Images" folder may be stored the image corresponding to the input for representing judgment as an inadequately trimmed image made by the operator during the reproduction.

In the ID card production center 100 in the ID card issuing system in the embodiment shown in FIG. 1, the detection unit 50 carries out the marking processing on the trimmed images displayed in the predetermined time range before the input indicating finding by the operator of an inadequately trimmed image, and marks the images as the image group. However, at the time of marking, reproduction of the subsequent images may be suspended temporarily so that the operator can reconfirm the images in the marked image group through reproduction of the images in the group at a slower image display rate (such as 3 seconds for one image). Alternatively, the images in the group may be displayed one by one as in the case of the images in the "Inadequately Trimmed Image Candidates" folder so that the operator can carry out operation such as clicking or pressing a predetermined key. In this case, the image to be displayed is changed in response to the operation by the operator, and the operator inputs an instruction to resume reproduction by using the input means 30 after completion of reconfirmation of the images in the marked image group. Thereafter, the images starting from the image at which the reproduction was suspended are displayed serially. In this manner, the marking processing for the candidates of an inadequately trimmed image and confirmation of the inadequately trimmed image can be carried out alternately.

Since an inadequately trimmed image exists extremely rarely in the trimmed images, serial reproduction of the trimmed images may be suspended temporarily when the operator carries out the input for indicating finding of an inadequately trimmed image during the serial reproduction. In this case, the images starting from the image being displayed at the time of input may be reproduced in reverse order at a slower image display rate (such as 3 seconds for one image) so that the operator can reconfirm the images. When the operator carries out the input for indicating finding of an inadequately trimmed image, the image is stored as a true inadequately-trimmed image or output to the trimming processing unit 20 for re-trimming thereof. When the operator inputs an instruction to restart reproduction, the images starting from the image at which reproduction was suspended are reproduced serially. In this case, the images reproduced before the image being displayed at the time of reproduction suspension are marked.

In the ID card issuing system in this embodiment, no correspondence has been explained between the photographs, the trimmed images, and items on the ID cards (such as the name, the date of birth, the date of employment, a section, and a title), for the sake of simpler explanation. However, a database may be used for storing employee ID numbers and personal data (including the items on the ID card) of the respective employees so that the employee ID numbers are respectively added to the photographs and the trimmed images as the ID numbers. The card generation unit 60 reads the personal data corresponding to the employee ID numbers added to the trimmed images for the respective employees from the database in order to generate the employee identification cards.

The present invention can be applied not only to a system such as the ID card issuing system for using a face as the part to be trimmed but also to any system wherein detection of an inadequately trimmed image caused by failure of automatic trimming is necessary among a large amount of trimmed images generated through the automatic trimming of photographs representing subjects of the same type. For example, the present invention can be applied to a system for generating a catalog of used cars.

What is claimed is:

1. An inadequately trimmed image detection method for detecting an inadequately trimmed image generated by failure of automatic trimming processing among a large amount of trimmed images in a predetermined size generated by the automatic trimming processing wherein a trimming range is cut and/or scaled from respective photographs obtained by photography of subjects of the same type so that a target part to be trimmed is laid out in a predetermined position in a predetermined size in the trimming range, the inadequately trimmed image detection method comprising the steps of:
   carrying out sequential reproduction of the trimmed images on a display screen in a predetermined position of the screen at a predetermined image display rate; and
   carrying out marking processing for identifying an image group including the inadequately trimmed image, based on a user input indicating a finding by the user of the inadequately trimmed image during the reproduction,
   wherein the predetermined image display rate ranges from 10 images per second to 50 images per second, and
   wherein the marking processing is processing for identifying the trimmed images reproduced in a predetermined time range before the input as the image group.

2. The inadequately trimmed image detection method according to claim 1, wherein a guide image is displayed in superposition on the trimmed images during the reproduction thereof, the guide image representing a position of the target part in the trimming range in an adequately trimmed image generated in the case where the automatic trimming processing is carried out properly.

3. An inadequately trimmed image detection apparatus for detecting an inadequately trimmed image generated by failure of automatic trimming processing among a large amount of trimmed images in a predetermined size generated by the automatic trimming processing wherein a trimming range is cut and/or scaled from respective photographs obtained by photography of subjects of the same type so that a target part to be trimmed is laid out in a predetermined position in a predetermined size in the trimming range, the inadequately trimmed image detection apparatus comprising:
   a reproduction unit for carrying out sequential reproduction of the trimmed images on a display screen in a predetermined position of the screen at a predetermined image display rate;
   an input device for receiving a user input indicating a finding by the user of the inadequately trimmed image during the reproduction; and
   a marking unit for carrying out marking processing for identifying an image group including the inadequately trimmed image, based on the input from the input device,
   wherein the predetermined image display rate used by the reproduction unit ranges from 10 images per second to 50 images per second, and wherein the marking unit identifies the trimmed images reproduced in a predetermined time range before the input as the image group.

4. The inadequately trimmed image detection apparatus according to claim 3 further comprising a image display rate setting unit for setting the image display rate, wherein
the reproduction unit carries out the reproduction according to the image display rate set by the image display rate setting device.

5. The inadequately trimmed image detection apparatus according to claim 3, wherein the reproduction unit displays a guide image in superposition on the trimmed images, the guide image representing a position of the target part in the trimming range in an adequately trimmed image generated in the case where the automatic trimming processing is carried out properly.

6. The inadequately trimmed image detection apparatus according to claim 3 further comprising a reproduction control unit for causing the reproduction means to carry out the reproduction of the trimmed images for a plurality of times in different reproduction order and/or image display rate, wherein
the marking unit carries out the marking processing in the respective times of the reproduction by the reproduction unit.

7. The inadequately trimmed image detection apparatus according to claim 6 further comprising an extraction unit for extracting the trimmed images included in all the image groups obtained by the marking unit in all the times of the reproduction as candidates for the inadequately trimmed image.

8. A computer-readable medium on which is embodied a program executable by a computer to perform an inadequately trimmed image detection procedure for detecting an inadequately trimmed image generated by failure of automatic trimming processing among a large amount of trimmed images in a predetermined size generated by the automatic trimming processing wherein a trimming range is cut and/or scaled from respective photographs obtained by photography of subjects of the same type so that a target part to be trimmed is laid out in a predetermined position in a predetermined size in the trimming range, the inadequately trimmed image detection procedure comprising the steps of:
carrying out sequential reproduction of the trimmed images on a display screen in a predetermined position of the screen at a predetermined image display rate; and
carrying out marking processing for identifying an image group including the inadequately trimmed image, based on a user input indicating a finding by the user of the inadequately trimmed image during the reproduction,
wherein the predetermined image display rate ranges from 10 images per second to 50 images per second, and
wherein the marking processing is processing for identifying the trimmed images reproduced in a predetermined time range before the input as the image group.

* * * * *